July 10, 1951 A. T. VAN URK 2,560,375

CORELESS MOVING COIL SYSTEM FOR MEASURING INSTRUMENTS

Filed July 20, 1946

INVENTOR
AREND THOMAS VAN URK

BY
AGENT

Patented July 10, 1951

2,560,375

UNITED STATES PATENT OFFICE 2,560,375

CORELESS MOVING COIL SYSTEM FOR MEASURING INSTRUMENTS

Arend Thomas van Urk, Eindhoven, Netherlands, assignor to Hartford National Bank and Trust Company, Hartford, Conn., as trustee Application July 20, 1946, Serial No. 685,166
In the Netherlands December 1, 1943

Section 1, Public Law 690, August 8, 1946
Patent expires December 1, 1963

3 Claims. (Cl. 171—95)

This invention relates to a core-less moving coil system, particularly for measuring instruments, in which the coil moves between the poles of a magnetic field and there is a non-linear, particularly a logarithmic relationship between the angular rotation of the coil and a quantity that acts on the system.

In certain cases there is the need for a system of this kind for determining ratios of the varying values of the said quantity, for example the strength of a current passing through the coil, up to about 1:1000. For example, it is desirable to measure such ratios with sufficient accuracy with the understanding that in a measuring instrument equal percentage differences in the current strength can be read with equal accuracy at the beginning and at the end of the scale. In this manner it is possible to construct, for example, a decibelmeter for about 60 decibel, the term decibelmeter being understood to mean a meter in which there is the above-mentioned logarithmic ratio between the angular rotation and the quantity that acts on the system. To our knowledge such a system has not been realized in practice hitherto. The possibility of reading ratios of the kind hereinbefore referred to up to about 1:1000 depends on the possibility of securing the required field variations through a distance equal to the maximum angular rotation of the coil.

According to the invention, this may be achieved by means of a system in which the width of the pole pieces is not more than ⅛ of the spacing of the pole pieces and the latter are largely shunted, at least on one side, by a member of magnetically conductive material which is arranged so as to be magnetically separated from the pole pieces and which is located along the coil path.

In the system according to the invention, the coil, when moving outside the pole pieces, should traverse a path along which a very rapid and strong decrease of the field strength occurs. This is essentially ensured for the first part of the path by the first-mentioned feature according to which the width of the pole shoes is not more than ⅛ of their spacing. For the greater part of the remaining path which the coil has to traverse at the larger angular rotations the decrease of field strength is, however, found to be too low so that the second measure adopted in accordance with the invention is of importance. In this case, the magnetically conductive material consequently plays the part of a body absorbing lines of force and thus essentially ensures very intense field weakening.

The dimensions and arrangement of this body are dependent upon the chosen non-linear relationship of the desired scale. In connection with the obtainment of a logarithmic scale highly favourable conditions are created if, according to the invention, the body of magnetically conductive material is constituted by a part of a cylindrical surface preferably concentric to the coil.

In addition, according to a further feature of the invention, the body has formed in it apertures arranged at suitable points so that as accurate a matching to the desired scale division as possible is ensured.

It has been found possible by reference to the above-indications to realize in practice a decibelmeter having a scale division, none of the scale divisions diverging by more than 25% from the mean value.

The invention will be described with reference to the drawing in which.

Figure 1:
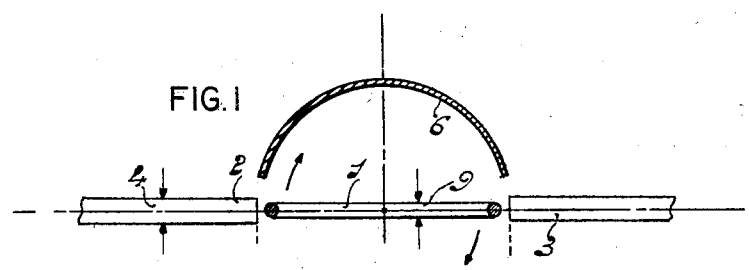
Fig. 1 is a plan view of a coil-system for an electrical measuring system according to the invention.
Figure 2:
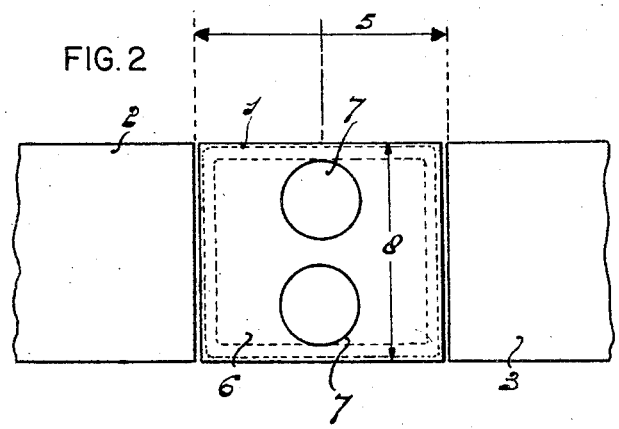
Fig. 2 is a view in elevation of a coil system shown in Fig. 1.

Referring to the figures, a moving coil 1 is arranged between the poles 2 and 3 of a magnetic field whose width 4 is slightly less than ⅒ part of the spacing 5 between the pole pieces. The path described by the coil 1 when moving beyond the pole pieces is largely surrounded by a member 6 arranged so as to be magnetically separated from the poles and made of magnetically conductive material, for example soft iron, in the form of a cylindrical surface substantially concentric to the coil path. The distance between the poles and the cylinder 6 depends not only on the desired course of the scale division but also on other factors, such as the nature of the magnetic material, the distance between the coil and the cylinder 6 and the thickness of the latter.

As a further refinement the side elevation shows apertures 7 by means of which any excessive field weakening by the cylinder can be compensated in order to ensure as accurate a matching to the scale as possible. Instead of or in combination with the apertures 7 other alterations of the form and/or arrangement of the cylinder 6 may be made, such as a varying thickness, varying distance between the coil and the cylinder 6 and a varying height 8 of the latter.

In a moving coil system realized in practice for a decibelmeter of about 60 decibel according to the invention the width 4 of the pole pieces was about 2 mm. with a spacing 5 of about 20 mm. The clearance between the coil and the poles was about ½ mm. and on only one side of the pole pieces a semicircle-cylinder wall of soft iron having a mean radius of 10 mm. and whose centre was shifted by 7 mm. from the centre of the system in a direction normal to the air gap was arranged. The thickness of the cylinder wall was 1.5 mm. Finally, a value of 1 mm. was chosen for the coil width 9.

Figure 3:
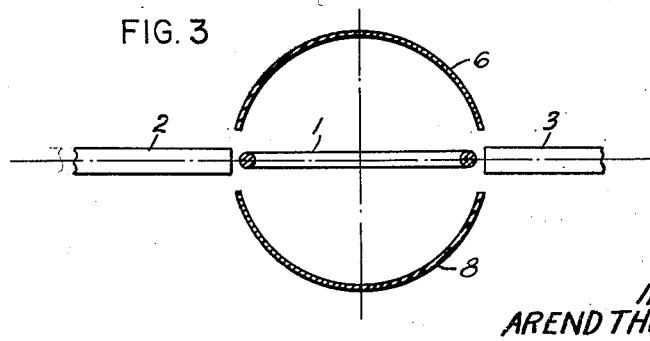
Fig. 3 is a plan view of a modification of the coil system shown in Fig. 1.

It is obvious that instead of one single cylinder such a member may be arranged on either side of the pole pieces as, for example, in Fig. 3 in which the members are designated 6 and 8 respectively and may in this case have half the height of the first-mentioned cylinder.

What I claim is:

1. A coreless moving coil system for non-linear measuring instruments comprising a pair of spaced apart opposed pole members of opposite polarity defining an air-gap therebetween having a given dimension in a given direction, said pole members having a thickness dimension which is less than one-eighth of said given dimension, a coil member pivoted to rotate within said air-gap, and a member of magnetic material having a relatively low retentivity magnetically separated from said pole members and positioned in close proximity to the path of rotation of said coil member for absorbing magnetic lines of force and to locally weaken the magnetic field in said air-gap.

2. A coreless moving coil system for non-linear measuring instruments comprising a pair of spaced apart opposed pole members of opposite polarity defining an air-gap therebetween having a given dimension in a given direction, said pole members having a thickness dimension which is less than one-eighth of said given dimension, a coil member pivoted to rotate within said air-gap, and a partially cylindrical member of magnetic material having a relatively low retentivity magnetically separated from said pole members and positioned concentric with the path of rotation of said coil member for absorbing magnetic lines of force and to locally weaken the magnetic field in said air-gap.

3. A coreless moving coil system for non-linear measuring instruments comprising a pair of spaced apart opposed pole members of opposite polarity defining an air-gap therebetween having a given dimension in a given direction, said pole members having a thickness dimension which is less than one-eighth of said given dimension, a coil member pivoted to rotate within said air-gap, and a partially cylindrical member of magnetic material having a relatively low retentivity provided with apertured portions magnetically separated from said pole members and positioned concentric with the path of rotation of said coil member for absorbing magnetic lines of force and to locally weaken the magnetic field in said air-gap.

AREND THOMAS van URK.

REFERENCES CITED

The following references are of record in the file of this patent:

UNITED STATES PATENTS

| Number | Name | Date |
|---|---|---|
| 570,454 | Coleman | Nov. 3, 1896 |
| 1,932,911 | Rolfe | Oct. 31, 1933 |
| 1,985,082 | Faus | Dec. 18, 1934 |
| 2,179,305 | Stickney et al. | Nov. 7, 1939 |

FOREIGN PATENTS

| Number | Country | Date |
|---|---|---|
| 514,254 | Great Britain | Nov. 3, 1939 |
| 518,919 | Great Britain | May 12, 1940 |